United States Patent

Stoklasek

[15] 3,674,282

[45] July 4, 1972

[54] PNEUMATIC STABILIZING SYSTEM FOR VEHICLES

[72] Inventor: Antonin Stoklasek, 82 First St., Perth Amboy, N.J. 08861

[22] Filed: Sept. 4, 1970

[21] Appl. No.: 69,849

[52] U.S. Cl. ........................................280/124 F, 267/11 A
[51] Int. Cl. ..................................................B60g 7/00
[58] Field of Search ...................280/104, 124 F; 267/11 A

[56] References Cited

UNITED STATES PATENTS 3,141,659  7/1964  Lyon....................................267/11 A
2,003,511  6/1935  Mercier...............................267/11 A X

*Primary Examiner*—Philip Goodman
*Attorney*—Walter W. Gerber

[57] ABSTRACT

The stabilizing system comprises four resilient air filled bellows suspending the car body on the wheels and a stabilizing bellow unit containing four separate bellow sections mutually connected on a common spring-loaded plate. Each bellow section is pneumatically connected to an assigned suspension bellow by a pipe. A tensioning spring for the common plate is seated on a base plate the position of which is adjusted by an adjustment screw.

5 Claims, 5 Drawing Figures

PATENTED JUL 4 1972 3,674,282
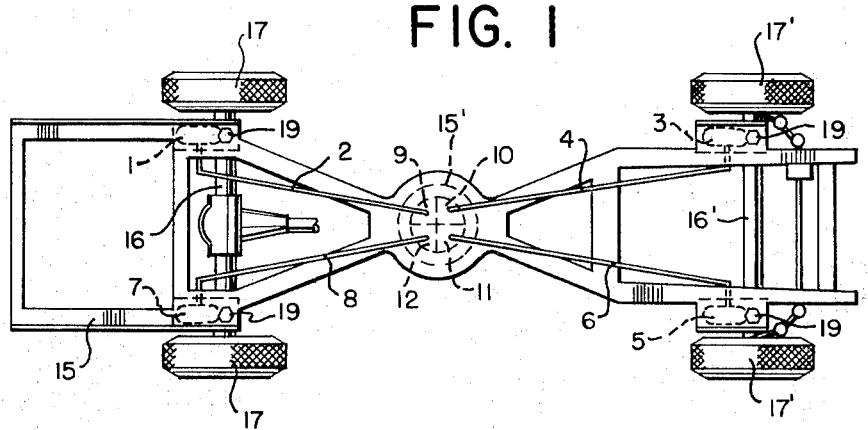
FIG. 1
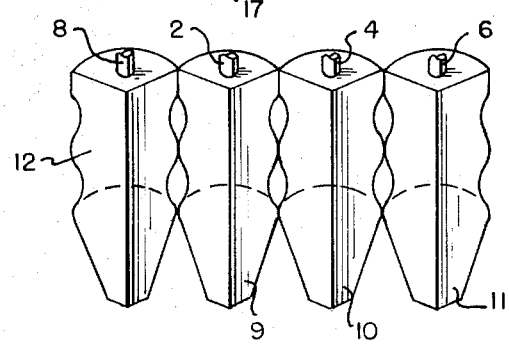
FIG. 2
FIG. 3
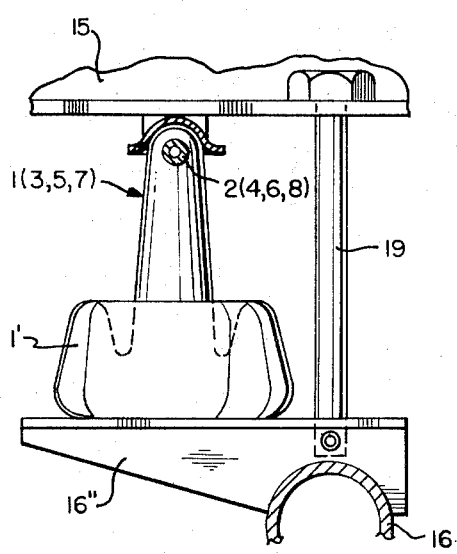
FIG. 4
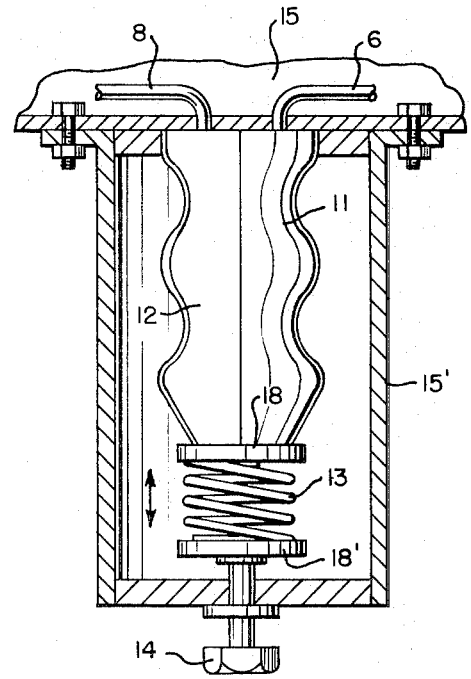
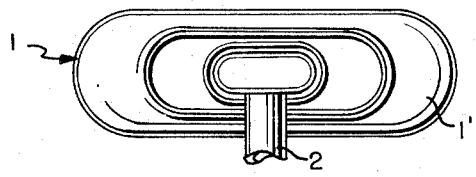
FIG. 5
INVENTOR.
ANTONIN STOKLASEK
BY Walter W. Geber
AGENT 3,674,282

PNEUMATIC STABILIZING SYSTEM FOR VEHICLES

BACKGROUND OF THE INVENTION

This invention relates generally to a stabilizing air suspension system for vehicles. More particularly, this invention relates to a stabilizing air suspension system for a car body on wheels which maintains a uniform horizontal position of the car body even at sharp turns at high speeds.

When a car turns a sharp bend at high speed the resulting inertia forces the car body to incline to one side and reduces the ground adhesion of the vehicle. At unfavorable conditions of the road, these forces may cause the vehicle to overturn and, consequently, serious damage or even loss of lives may result therefrom.

There are known various types of suspension systems for vehicle bodies which damp the oscillation so that only small forces are transmitted to the vehicle body itself. For example, piston-type or telescopic shock absorbers or various equalizing systems are known. These systems based on movable and frictional parts cannot, however, insure maximum effectivenes and failure free operation

SUMMARY OF THE INVENTION

It is, therefore, an object of this invention to provide a stabilizing air suspension system for cars, which has an increased effectiveness and reduces susceptibility to failure.

It is another object of this invention to provide a simple construction of the stabilizing air suspension system without any frictional parts.

In accordance with this invention, the above objects are attained by suspensing the body of the vehicle on a number, preferably four, suspension bellows of resilient material and filled with air, by providing an equal number of separate bellow sections mechanically connected into a single multisection bellow unit resting on a common axially movable plate, by pneumatically connecting each suspension bellow to an assigned bellow section by a pipe and by springloading the common plate and thus the entire multisection bellow unit by an adjustable spring. The adjustable spring may, for instance, be seated on a movable base plate the vertical position of which is determined by a setting screw. The bellow sections may be springloaded against the bottom of the vehicle body, or may be arranged in a separate box.

BRIEF DESCRIPTION OF SEVERAL VIEWS OF THE DRAWING

For a better understanding of this invention, reference may be made to the following detailed description of an exemplary embodiment, taken in conjunction with the figures of the accompanying drawing in which:

FIG. 1 is a schematic, partly cut-away plan view of a vehicle with the stabilizing air suspension system according to this invention;

FIG. 2 is a perspective view of a disassembled set of separate bellow sections of the multiplesection bellow unit;

FIG. 3 is an elevational view, partly in section, of the outer suspension air bellow;

FIG. 4 is an elevational view, partly in section, of the arrangement of the spring-loaded set of central bellow sections; and FIG,5 is a plan view of the suspension bellow of FIG. 3.

DETAILED DESCRIPTION OF A PREFERRED EMBODIMENT

Referring now to FIG,1, there is shown a vehicle having wheels 17 and 17', wheel axles 16 and 16' and a vehicle body 15 suspended on the axles 16 and 16' by means of air-filled suspension bellows 1, 3, 5 and 7.The suspension bellows are made of a suitable resilient material, are identical in configuration as well as in operational properties and their design may vary in accordance with specific requirements of an actual vehicle.

FIGS. 3 and 5 show an embodiment of a resilient,air filled suspension roller bellow 1 disposed between the axle 16 and the vehicle body 15. The suspension bellow operates without any frictional parts.Since the springing movement of the bellow 1 can be effected only in the axial direction a vertical guiding bar 19 is employed between the seat 16" of the bellows and the vehicle body 15. In order to stabilize the car body 15 in its neutral or horizontal position four separate bellow sections 9 to 12 of resilient material are secured between a common support fixed on the bottom of car body 15 and a vertically movable common plate 18 which is spring-loaded by a compression spring 13.Each of the bellow sections 9 to 12 is pneumatically connected by pipes 2,4,6 and 8 to opposite suspension bellows 1, 3, 5 and 7 so as to form four separate pneumatic units sealed from each other.

The helical spring 13 is seated on a movable base plate 18' which is in contact with a setting screw 14 carried by a yoke 15' integral with the bottom of the car body 15. By adjusting the bias against the air-filled bellow sections 9 to 12, the stabilizing action of the system can be very finely adjusted t$_\infty$the applied loads. The application of resilient bellows and bellow sections has the advantage that respective pneumatic units are under a a constant air pressure and no pressure loss will result.Besides,unreliable frictional parts,such as pistons and telescopes are hereby eliminated.

The operation of the entire stabilizing system is as follows:

Assuming that in a bend the body 15 of the vehicle is inclined against the suspension bellows 5 and 7. The bellows 5 and 7 thus become compressed whereas the remaining bellows 1 and 3 become extended.As a result thereof a pressure increase in the suspension bellows 5 and 7, proportional to the weight pulse from the vehicle body 15, is transmitted through pipes 6 and 8 to the central bellow sections 11 and 12.Due to this transmitted pressure the bellow sections 11 and 12 become expanded and counteract and compress the spring 13 via the comon plate 18. Simultaneously, the transmitted pressure pulse,derived from the own weight pulse of the inclining car body 15, extends the bellow section 9 and 10 and prevents the suspension bellows 1 and 3 from departing from their normal horizontal position. These stabilizing movements take place at any angle of inclination of the vehicle body 15 and effectively maintain the neutral horizontal position of the latter. Especially effective stabilizing action occurs during the quick breaking when an increased weight portion of the car body 15 is imposed on the front wheels 17. The stabilizing system of this invention redistributes instantly the weight on all four wheels.

A particular advantage of the stabilizing system of this invention resides in the fact that the entire system is under a constant pressure without the use of any movable parts so that the resulting structure is very simple and provides the maximum stabilizing effect at any speed of the vehicle.At the same time,the stabilizing system performs three functions,namely the stabilization, the springing of the car body and the shock absobtion.

It will be apparent to one skilled in the art that this invention is susceptible of many modifications without departing from the spirit and scope of the appended claims.For instance,the entire stabilizing multisection bellow unit containing the bellow sections 9 to 12, the yoke 15',the adjustment screw 14, the spring 13, the common plate 18 and the base plate 18' can be arranged in a separate box apart from the vehicle body 15.

What is claimed is:

1. A pneumatic stabilization system for vehicles comprising, in combination, a number of air filled resilient suspension bellows suspending the vehicle body; an equal number of bellow sections disposed on a movable common plate and mechanically connected into a single multisection unit; spring means loading said common plate and thus the entire multisection bellow unit in axial direction; conduit means pneumatically connecting respective suspension bellows to assigned bellow sections of said multisection unit, thereby transforming a pressure pulse from a suspension bellow into a uniform movement of all bellow sections; a movable base plate for supporting said spring means; a yoke integral with the vehicle body and surrounding said multisection bellow unit; and an adjustment screw disposed in said yoke opposite said base plate to prestress said spring means and thus said multisection bellow unit against said vehicle body in accordance with the load applied.

2. A pneumatic stabilization system for vehicles comprising, in combination, a number of air filled resilient suspension bellows suspending the vehicle body; an equal number of bellow sections disposed on a movable common plate and mechanically connected into a single multisection unit; spring means loading said common plate and thus the entire multisection bellow unit in axial direction; and conduit means pneumatically connecting respective suspension bellows to assigned bellow sections of said multisection unit, thereby transforming a pressure pulse from a suspension bellow into a uniform movement of all bellow sections, said multisection bellow unit, said common plate and said spring means being arranged in a separate box.

3. A pneumatic stabilization system in a vehicle comprising, in combination, a plurality of gas-filled resilient suspension bellows suspending the body of said vehicle from respective wheels of the vehicle; a fixed support on said vehicle; a plate member movable relative to said support; a plurality of bellow sections, each section being directly interposed between said plate member and said support; spring means loading said plate member for moving the same relative to said support and for thereby deforming said bellow sections; and a plurality of conduits respectively connecting said suspension bellows to said bellow sections, each conduit and the suspension bellow and bellow section connected by said conduit constituting a pneumatic unit sealed from the other pneumatic units.

4. A system according to claim 3, wherein said spring means include a spring member operatively interposed between said support and said plate member and biasing said plate member toward said support for compressing said sections.

5. A system as set forth in claim 4, wherein said spring member is a compression spring.

* * * * *